United States Patent [19]

DeWitt

[11] 4,232,884
[45] Nov. 11, 1980

[54] LIGHTWEIGHT TRAILER BED CONSTRUCTION

[76] Inventor: Merl DeWitt, 38 Carr St., Lakewood, Colo. 80226

[21] Appl. No.: 936,242

[22] Filed: Aug. 24, 1978

[51] Int. Cl.² ............................................. B62D 21/00
[52] U.S. Cl. .................................... 280/785; 280/789; 280/800
[58] Field of Search ............... 280/785, 800, 798, 799, 280/781, 789; 52/666, 664, 690; 296/181; 296/182

[56] References Cited

U.S. PATENT DOCUMENTS

| | | | |
|---|---|---|---|
| 2,812,192 | 11/1957 | Cole | 280/789 |
| 2,846,263 | 8/1958 | La Rue | 296/182 |
| 3,995,403 | 12/1976 | Nickell | 52/664 |

FOREIGN PATENT DOCUMENTS

| | | | |
|---|---|---|---|
| 959514 | 12/1974 | Canada | 280/789 |
| 360972 | 11/1931 | United Kingdom | 52/664 |

Primary Examiner—Robert R. Song
Attorney, Agent, or Firm—Richard D. Law

[57] ABSTRACT

A framework structure including longerons and lateral ribs formed of relatively thin plate metal having bent-over long edges forming channels or Z-sections riveted and welded together forming a lattice type framework, as a supporting frame for a lightweight trailer construction. The frame construction includes channel-shaped struts or longerons and Z-shaped laterals and peripheral longerons.

6 Claims, 20 Drawing Figures

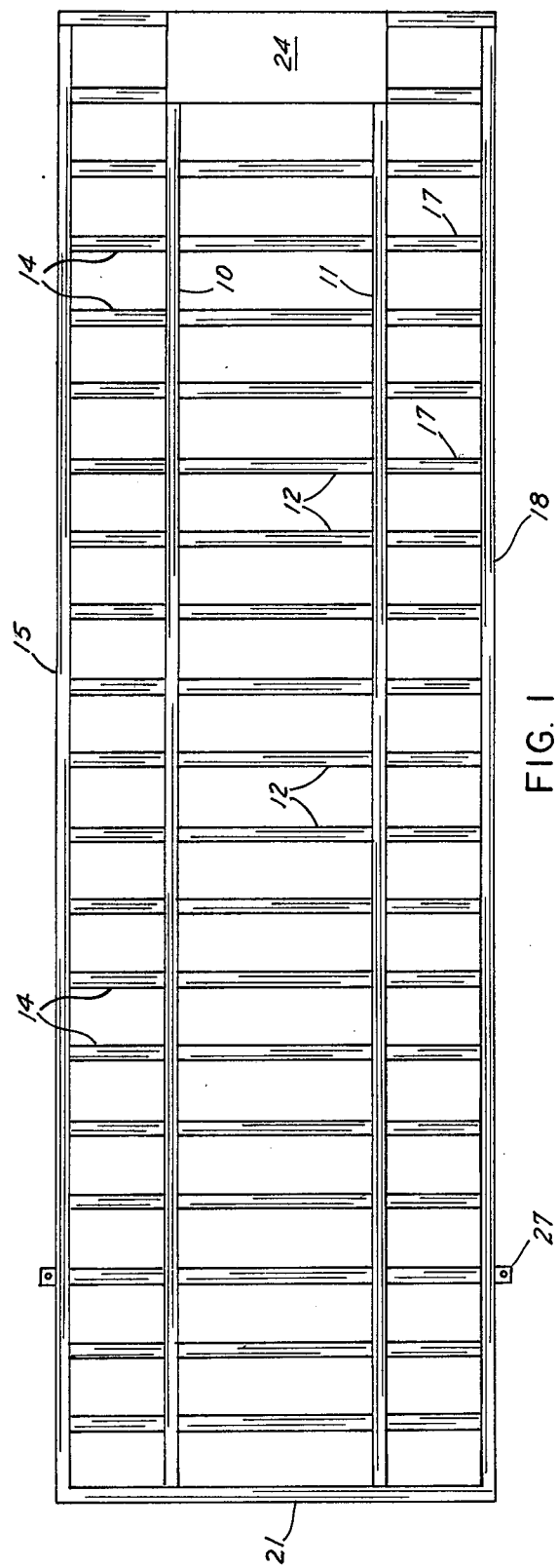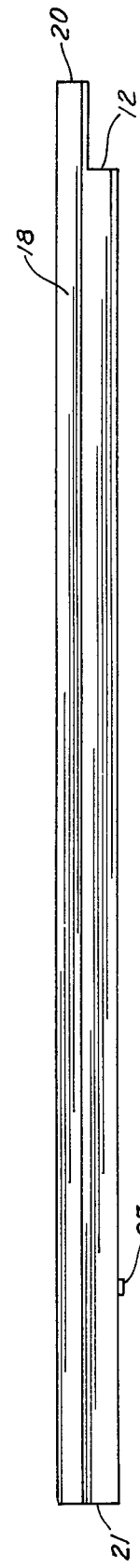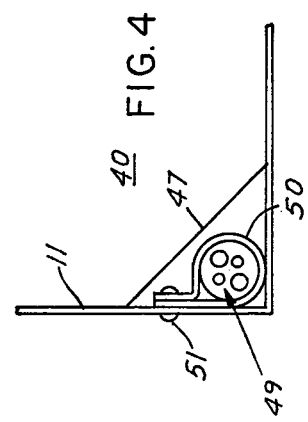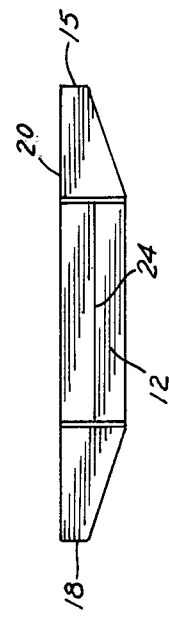
FIG. 1
FIG. 2
FIG. 3
FIG. 4

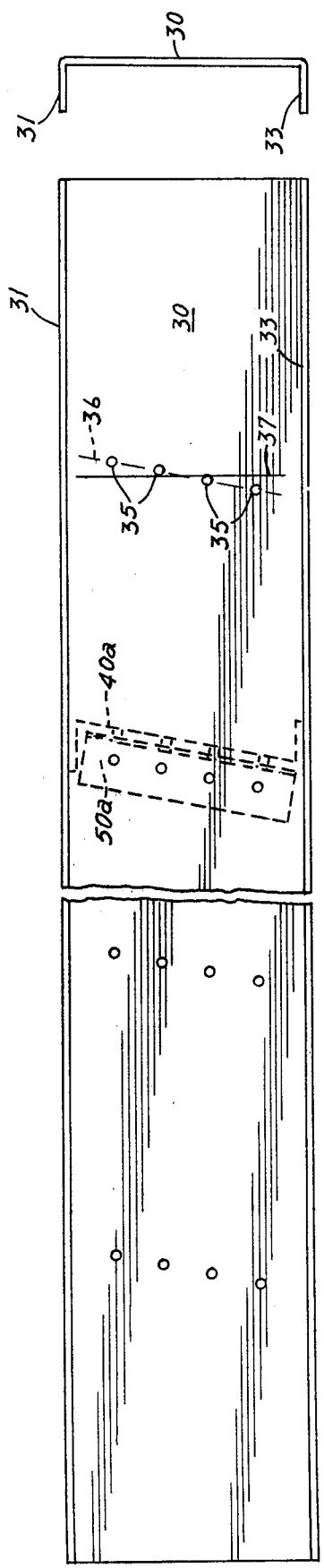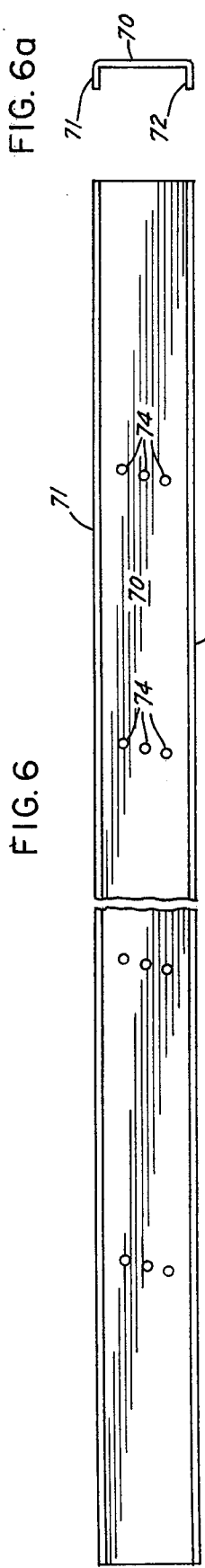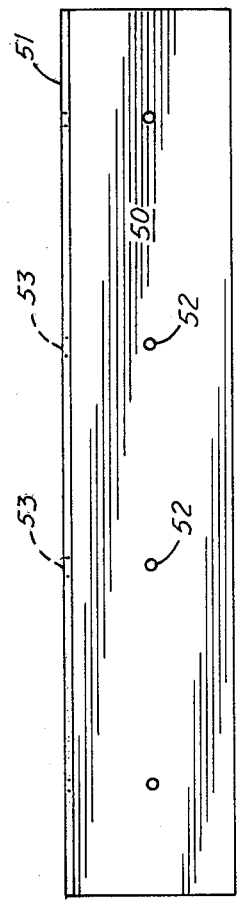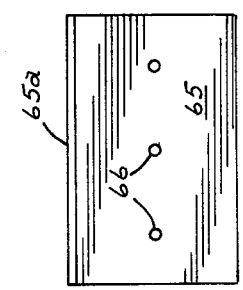

LIGHTWEIGHT TRAILER BED CONSTRUCTION

This invention relates to light trailer bed construction of a lattice type form, with frame members formed of metal plate with edges broken and turned generally laterally to the plane of the plate, for strength, and riveted and welded together in a grid position for the attachment of a deck and a skin to the framework.

Large size trailers are common for freight hauling, and are usually of the fifth wheel, semi-trailer type. These are for hauling large, heavy loads, and have massive, heavy frames. Most of the trailers are long, and must have long spacs between supporting members, i.e. trailer wheels and connecting fifth wheel. Such long spans require a massive framework of heavy I-beam as longitudinal members and heavy laterals. Many such trailers are commonly used for long distance hauling.

Urban freight hauling, on the other hand, is generally conducted by trucks of various sizes, generally sized by maximum load carrying capacity. Thus, the engine for the truck must be sized to the maximum load to be carried by the truck. There exists a substantial capitol expense load for the freight, as it is based on the capitol cost and operating expense regardless of the actual load carried. This produces a situation where the per mile cost is generally the same whether a full load or a partial load is hauled, creating a vast difference in unit cost per pound mile of freight. Loading time is, also, an important item for trucks, since a driver normally is idle during the loading and unloading. The capitol costs as well as some operating costs continue to run when the truck is idle or being loaded and unloaded. An idle truck awaiting a load is an undue expense, as the driver must be available as soon as the truck is loaded. Too often the size of the truck simply does not suit the load to be hauled.

THE INVENTION

The present invention provides a lightweight trailer construction, ideally suited for urban freight handling since it is relatively inexpensive and may be towed by an inexpensive small truck. This permits the trailer to remain idle or for loading and unloading without the tractor and driver being present. The units are small and efficient for city travel, reducing expenses of urban freight for hauling and saving energy.

This invention involves a trailer bed construction which is adaptable as an open flat bed, stake bed, enclosed trailer or other constructions which may be mounted on the bed.

The construction includes frame members of formed metal plate with lateral edges secured together as an open frame of a lattice construction. A skin or floor is secured over the top of the frame for supporting the load. Wheel attachment means are provided adjacent one end of the trailer bed, and fifth wheel attachment means are provided at the other end.

OBJECTS AND ADVANTAGES OF THE INVENTION

Included among the objects and advantages of the invention is to provide a small, lightweight frame construction for small trailers.

Another object of the invention is to provide a framework formed of metal plate members having their edges broken to a lateral position forming channel-shaped members and Z-shaped members.

Yet another object of the invention is to provide a trailer frame construction having a pair of center struts or longeron channel-shaped members, and outside struts of channel-shaped members secured together by Z-shaped laterals.

Still another object of the invention is to provide a trailer construction for attaching Z-shaped lateral members to channel shaped longeron members providing an open lattice-type frame with the upper edges of all the members in planar alignment.

GENERAL DESCRIPTION OF THE DRAWINGS

These and other objects and advantages of the invention may be ascertained by reference to the following description and appended drawings, in which:

FIG. 1 is a top plan view of a frame for a trailer, according to the invention;

FIG. 2 is a side elevation of the device of FIG. 1;

FIG. 3 is an end elevational view thereof;

FIG. 4 is an enlarged detail, in cross-section, of a utility channel for the trailer of FIG. 1;

FIG. 6 is a side elevational view of a main spar for a lightweight trailer;

FIG. 7 is a side elevational view of a side edge spar for a lightweight trailer;

FIG. 8 is an end elevational view of an angle bracket for fastening members of the trailer together;

FIGS. 9 and 10 are side elevational views of different sizes of angle brackets;

SPECIFIC DESCRIPTION OF THE DRAWINGS

Figure 5:
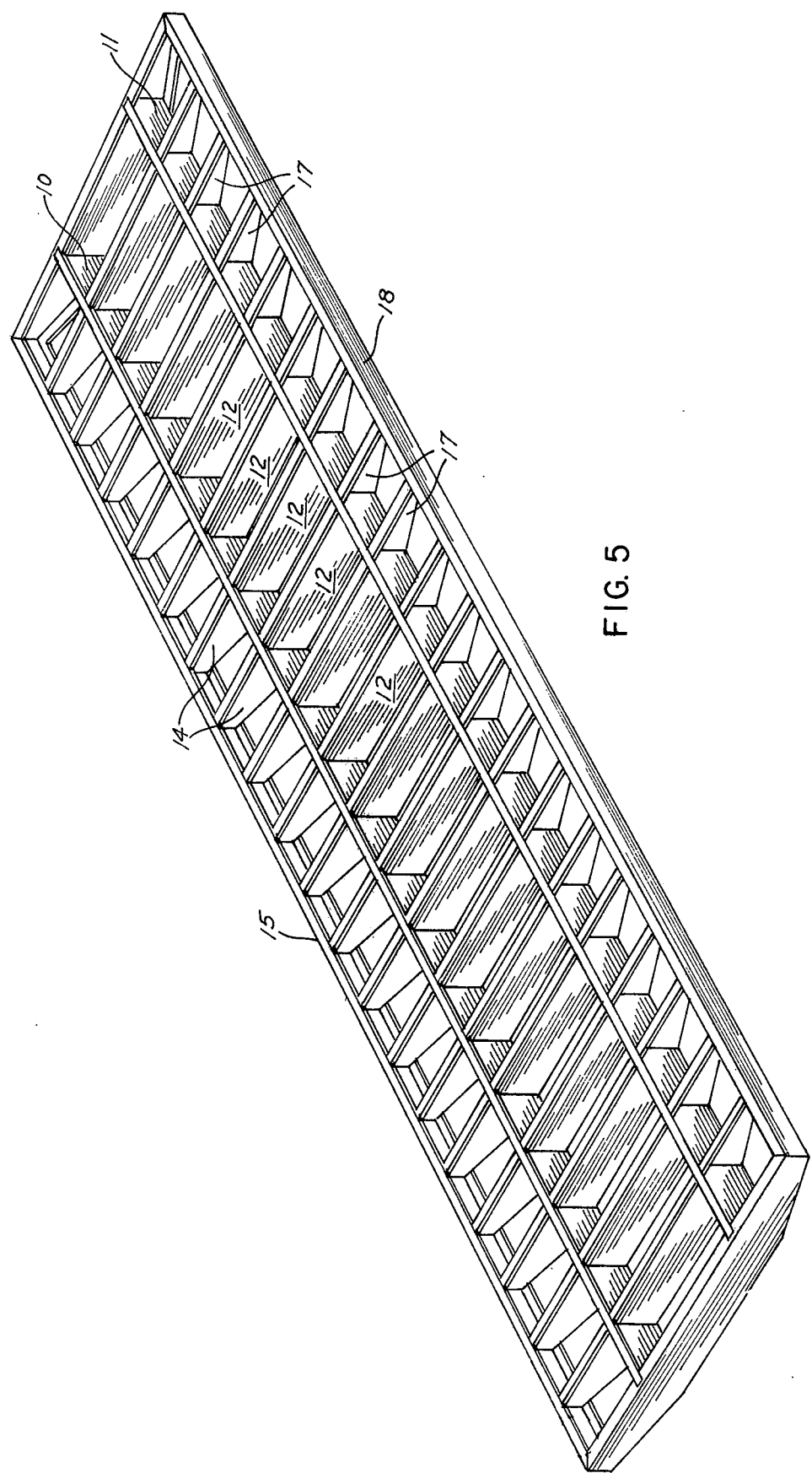
FIG. 5 is a perspective view of the frame of FIG. 1.

The frame of the invention for lightweight trailers is for loads of less than about 10,000 lbs., and arranged to be hauled as a semi-trailer by small, lightweight trucks. Trucks such as ½, ¾ or 1 ton pick-ups modified with a fifth wheel, small foreign pick-up trucks, similarly modified, and other similar prime movers may be used with the trailer of the invention. In general, the structural members are formed of 12 gauge metal plate, with the edges broken (bent) at about right angles to form channels or Z-sections depending on location of the member. Two main channels, called spars or struts, support a series of lateral Z-members, and side channels box the laterals, with the top edges of all members in planar alignment forming a lightweight floor frame, or bed for a trailer.

The assembly shown in FIGS. 1-5 is an open grid, lattice type frame including full length struts or longerons and edge longeron members, and a plurality of lateral members therebetween. A pair of central longerons or central strut members 10 and 11 support therebetween, a series of center lateral braces or members 12 which are uniformly spaced along the center members 10 and 11. A plurality of side laterals 14 on one side of longeron 10 extend outwardly to a side longeron 15. These laterals are spaced equally with the central laterals. On the opposite side of the central longeron 11, another series of side laterals 17 extend to a side longeron 18. These, also are equally spaced along with the central laterals. The members are joined together at their intersection with the longerons. The right end is enclosed by an end plate 20 and the left end is enclosed by end plate 21. A cut out portion on the right end plate is fitted with a horizontal 5th wheel support plate 24 which supports the trailer portion of a 5th wheel hitch, as is common on semi-trailer-tractor connections. A plurality of tie-down rods 27 (only one is shown) are placed under the cross members and may be welded or otherwise secured to the cross members. These have ends extending beyond the side rails for use as rope tiedowns when the trailer is used as a flatbed, stake bed, etc. These tiedowns may be placed where desired on the underside of the trailer.

If desired, the top may be covered by a platform or deck and, also, a lightweight skin may be secured to the members covering the bottom of the framework. Such a skin may be aluminum sheet or the like riveted to the lattice frame. Also, a wheel support plate may be secured to the trailer at or near the end opposite the 5th wheel connection end. This plate (not shown) may be welded or bolted in place, and may be positioned on the trailer in reference to the load to be carried, the tractor, etc.

The central longerons are formed of plate, with edges broken to 90° to the plane of the plate forming a channel. As shown in FIGS. 6 and 6a, a central channel includes a main web 30 (12 gauge metal) and upper edge 31 which is bent at 90° to the plane of the web 30. A lower edge 33 is bent at 90° in the same direction as edge 31, forming a channel-shaped member. A plurality of holes are bored through the web 30 at predetermined locations, (nominal 1 foot spacings) and the holes are on a center line at an angle to the perpendicular to longitudinal axis of the plane of the plate. Thus, holes 35 on centerline 36 are at about 12° angle to perpendicular line 37. The holes are spaced along the length of the center strut at the location of each lateral member, and the attachment is detailed below. The strut 10 is faced inwardly with its edges (top and bottom flanges) toward strut 11, which, also, has its edges directed inwardly.

Figure 11:
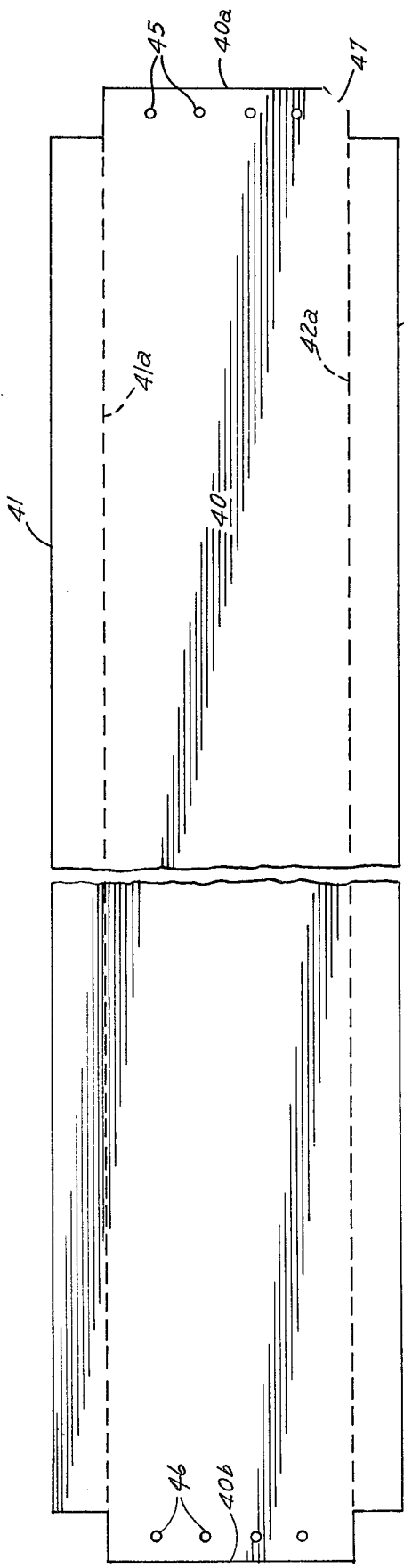
FIG. 11 is blank for forming into a Z-section lateral support for a trailer.
Figure 12:
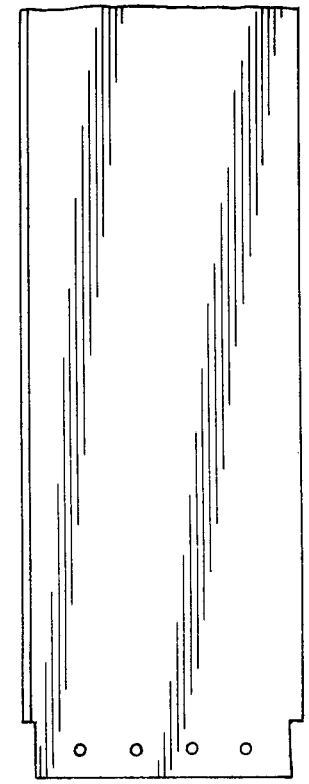
FIG. 12 is a completed Z-section lateral.
Figure 15:
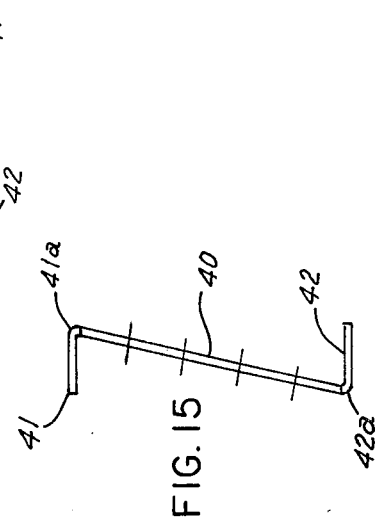
FIG. 15 is an end elevation of the device of FIG. 14.

The central laterals 12 are formed of plate (12 gauge metal) as shown in FIGS. 11, 12 and 15. A plate 40 has its upper edge 41 broken along bend line 41a, and its bottom edge 42 broken along bend line 42a. The upper edge is bent in one direction and the bottom edge is bent in the opposite direction. Each edge is bent at about 78° forming a Z-section, FIG. 15. The ends 40a and 40b of the web 40 are bored with a series of holes 45 and 46 arranged to mate with the holes in the angle brackets, respectively. These holes are used to attach the web to the center struts, explained below. A corner is cut out of end 40a leaving a bevel 47 which when butted against central strut 11, FIG. 4, leaves an opening for service lines 49 running the length of the framework central strut. The service lines, for electrical, air, etc. are thus protected from damage. The service lines may be secured by a looped strap 50, riveted by rivet 51 to the center strut 11.

The center laterals 12 are secured to the central struts 10 and 11 by means of angle connectors, FIG. 10, each of which includes one leg 50, a 90° leg 51, and a plurality of holes. Holes 52 are formed in web 50 and holes 53 are formed in the web 51 and are arranged to mate with the holes in the web of the main struts by tilting the angle, FIG. 6, which then places the web 40, FIGS. 11, 12 and 15, of the center laterals in position with the holes 53. The laterals are riveted to the center struts, FIG. 6, with a lateral on each side secured by an angle on each side. Thus, as shown in FIG. 6, an angle 50a mounted with its holes aligned with the holes in web 30, these being a complimentary angle on the other side of the web 30. A Z-section lateral is secured to the angle to extend at 90° to the center strut. The parts are arranged to be in top and bottom flush alignment, FIG. 5, when the laterals are secured to the long struts. This permits the assembly to have a loading deck secured to the top surfaces of elements of the frame. In this connection, the edges of the center laterals have cut out sections on each end of the edge, so that when in position with the central struts, the flanges of the central channels extend over the ends 40a and 40 b of the lateral so as to be in planar alignment with the flanges of the Z-section laterals.

Figure 14:
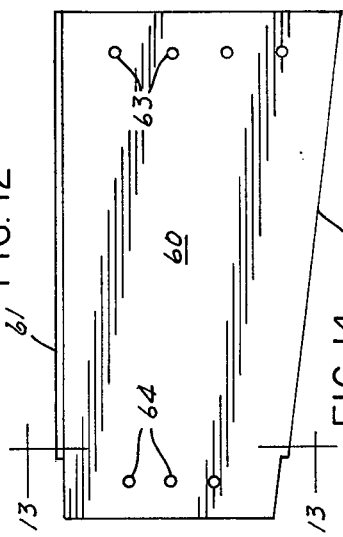
FIG. 14 is a plan view of an outer edge lateral support of a trailer.
Figure 13:
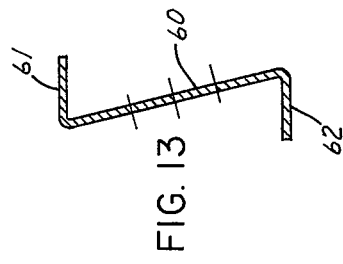
FIG. 13 is an end view of the device of FIG. 12.

The side laterals are formed of similar plate, FIGS. 13 and 14, where a web 60 has a top edge 61 bent at 78° and a sloped bottom edge 62, also bent at 78° in the opposite direction forming a Z-section. The bottom of the Z-section is tapered or sloped to provide a tapered frame section from the center struts to the side channels. A series of holes 63 in the large end of end lateral mates with the holes in an angle secured to the center strut and is riveted to the angle. The top flange 61 is in planar alignment with the top flange of central strut, but since the central strut has its flange turned inwardly, the top flange 61 extends to the edge of the lateral. On the other end, however, the outside strut or edge channel is turned inwardly and overrides the web 60 to be in the plane of the flange 61. Holes 64 in the small end of the lateral mate with the holes in a small angle 65 (FIGS. 8 and 9) to be attached to the outside edge strut.

The outside, or edge struts, box the framework and are secured to the side laterals. As shown in FIG, 7, a side strut includes web 70, top flange 71 and bottom flange 72. These are bent at 90° in the same direction, FIGS. 7 and 7a, forming a channel-shaped strut. The strut includes a plurality of a series of holes 74 spaced along the center strut in the same relative position of of the center laterals (nominally 1 foot spacing) so as to complete the laterals in a straight line from one side strut to the other side strut. The holes are at a 12° angle to accomodate the Z-section shape of the side laterals, FIG. 13. These are attached by the smaller angles 65, FIG. 9, which include a 90° leg 65a. Both legs are bored with a series of holes 66 and 67 arranged to mate the holes of the struts and side laterals.

Figure 16:
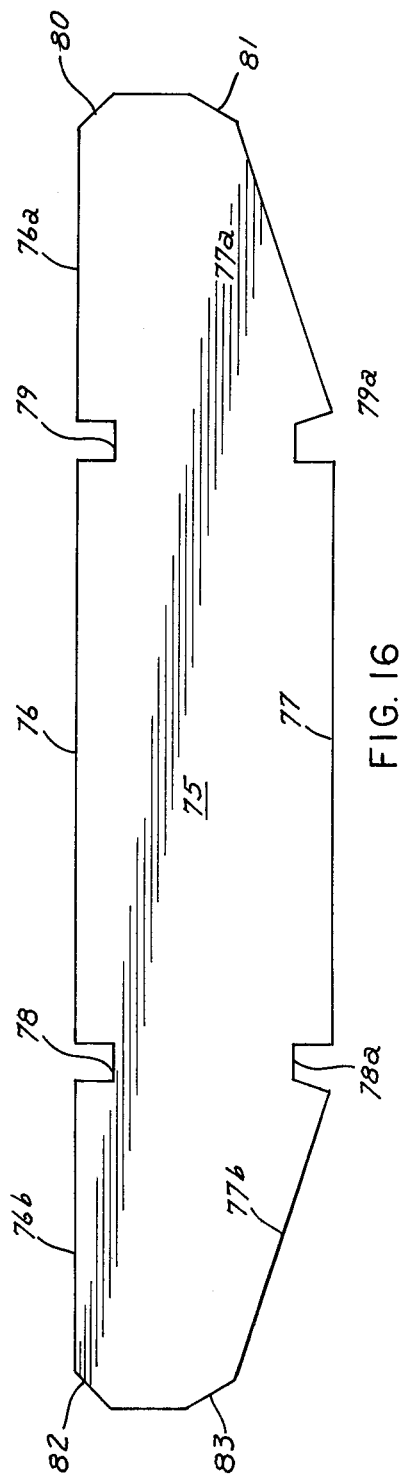
FIG. 16 is a plan view of a blank for an end member of a trailer.
Figure 17:
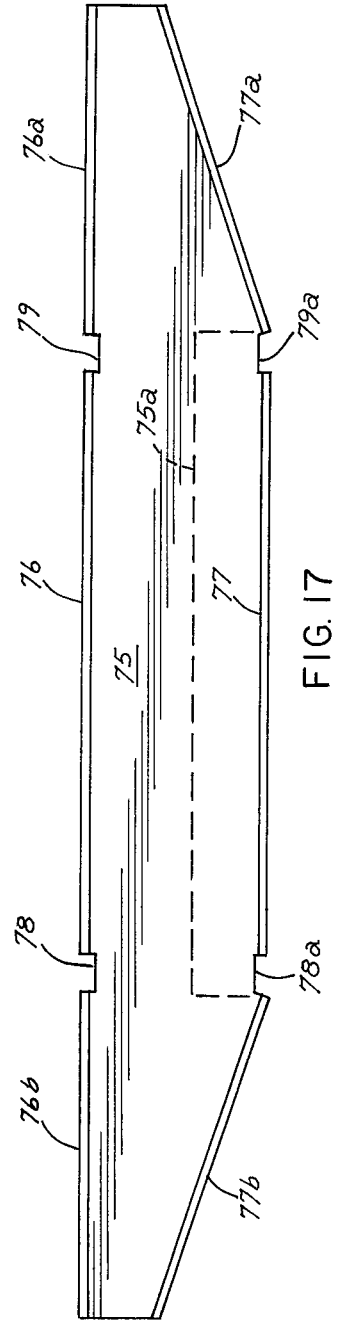
FIG. 17 is a plan view of the completed end member from the blank of FIG. 16; and, FIG. 18 is a top plan view of the end member of FIG. 17.
Figure 18:
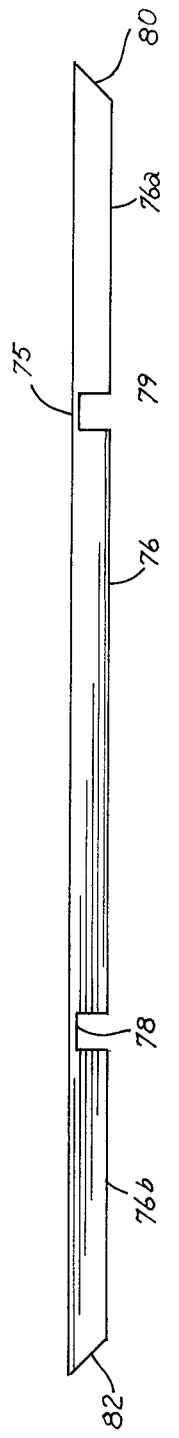

The end plates are formed of plate metal and the edges are turned down 90° to form a channel-shaped member. Thus, in FIGS. 16-18, a blank plate is cut to shape (in this case for the left end of FIG. 1). Notches 78, 78c and 79, 79a are cut out of the blank leaving on the upper side center edge 76 and side edges 76a and 76b. All the edges are bent at 90° to the plane of the plate and forms a channel-shaped end. The notches 78, 78a and 79, 79a, mate with the flanges on the center struts forming a flush joint. The 45° cut-outs 80, 81, 82 and 83 leave a 45° cut for a miter joint with the side channels and these are welded together. The right end plate is formed in the same manner as the left end plate, except that portion 75a of the center cut out, so that a draft support plate 24 may be welded in the position to mate with a 5th wheel connection.

The construction is riveted via the angles which may be also, welded after the rivets are set. As pointed out above, the bottom surfaces may be covered and with the top deck, forms an enclosed frame.

For one very effective size, the frame members are made of 12 gauge steel plate. The center struts as well as the side struts are 20 feet long. The center struts are formed with a 10" web and 2" flanges, and the laterals are secured through the series of holes by the angles at every foot. The center laterals are, also, formed with a 10" web and 2" flanges. The side struts are formed with a 4" web and 2" flanges, so that the side laterals are tapered for 10 inches to 4 inches. The holes bored in the plate may be arranged for ⅜" rivets, and the welding (which may be spot or continuous) adds strength to the framework. When using the 12 gauge material, the angles may be made of 16 gauge metal plate. For a 20 foot long trailer, it may be made 6 feet wide, so the center laterals are about 3 feet long and each side lateral is about 1½ feet long. These measurements must be made to take into account the thickness of the longeron struts, to give a 6 foot wide trailer.

What is claimed is:
1. A lattice frame for a lightweight trailer comprising:
   (a) at least two central channel members extending from end to end of the trailer, each said channel being formed of relatively lightweight metal plate with its longitudinal edges bent at approximately 90° providing flanges and a connecting web to form a channel;
   (b) a plurality of central Z-shaped members of substantially the same width as said central channels spaced along said channels and secured thereto, each Z-shaped member formed of relatively thin metal plate with opposed edges bent in opposite directions forming flanges at an acute angle of less than 90° to the plane of the web between said flanges and an angle member secured at each end of the web secured to the web of said central channels;
   (c) a plurality of outer Z-shaped members having opposed flanges at an acute angle to a web therebetween and having flanges on the ends of the web secured to said channels on the opposite side of said central Z-shaped members and extending outwardly and normally to said channels, said Z-shaped members being formed of relatively thin metal plate with opposed edges bent in opposite directions forming flanges at less than 90° to the plane of the web between said flanges;
   (d) outside channels being secured to the outside ends of said outer Z-shaped members, each said outside channel being formed of relatively thin metal plate having its longitudinal edges bent in the same direction at 90° to the web between said flanges;
   (e) a pair of end plates having top and bottom flanges formed by bending the top and bottom edges thereof at about 90°, said end plate being secured to the ends of said central channel members and said outside channels to complete the lattice frame;
   (f) the top flanges of all the elements being in planar alignment for the attachment of decking thereto.

2. A frame according to claim 1, wherein said Z-shaped members include flanges at about 78° to the plane of the web.

3. A frame according to claim 1, wherein said outer Z-shaped members have a horizontal top flange and an upwardly sloped bottom flange from the central channel to the outer channel.

4. A frame according to claim 1, including tiedown strap metal lengths secured underneath a series of said Z-shaped members.

5. A frame according to claim 1, wherein said central channel members are about 20 feet long and formed of 12 gauge metal plate, said central Z-shaped members and said outer Z-shaped members combined extend about 6 feet wide and are formed of 12 gauge metal plate.

6. A frame according to claim 5, wherein said central Z-shaped members are spaced about 1 foot apart and have about a 10" wide web.

* * * * *